United States Patent
Dunn et al.

(10) Patent No.: US 10,555,406 B2
(45) Date of Patent: *Feb. 4, 2020

(54) SYSTEM AND METHOD FOR DECREASING ENERGY USAGE OF A TRANSPARENT DISPLAY CASE

(71) Applicant: Manufacturing Resources International, Inc., Alpharetta, GA (US)

(72) Inventors: William Dunn, Alpharetta, GA (US); Rick De Laet, Alpharetta, GA (US)

(73) Assignee: MANUFACTURING RESOURCES INTERNATIONAL, INC., Alpharetta, GA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/113,278

(22) Filed: Aug. 27, 2018

(65) Prior Publication Data

US 2018/0368240 A1 Dec. 20, 2018

Related U.S. Application Data

(63) Continuation of application No. 15/782,373, filed on Oct. 12, 2017, now Pat. No. 10,455,671, which is a
(Continued)

(51) Int. Cl.
*H05B 37/02* (2006.01)

(52) U.S. Cl.
CPC ..... *H05B 37/0281* (2013.01); *H05B 37/0227* (2013.01); *H05B 37/0272* (2013.01); *Y02B 20/42* (2013.01)

(58) Field of Classification Search
None
See application file for complete search history.

(56) References Cited

U.S. PATENT DOCUMENTS

| 3,629,972 A | 12/1971 | Rehberg et al. |
| 4,040,726 A | 8/1977 | Paca |

(Continued)

FOREIGN PATENT DOCUMENTS

| AU | 2015277337 B2 | 5/2018 |
| CA | 2815355 A1 | 5/2012 |

(Continued)

OTHER PUBLICATIONS

A. Vogler & H. Kunkley, Photochemistry and Beer, Jan. 1982, 3 Pages, vol. 59, No. 1.
(Continued)

*Primary Examiner* — Seokjin Kim
(74) *Attorney, Agent, or Firm* — Standley Law Group LLP; Jeffrey S. Standley; Adam J. Smith (57) ABSTRACT

An apparatus for controlling the illumination of a display case containing a plurality of products includes a housing and an access panel. A transparent display is located in the access panel and is illuminated by an illumination device. A sensor is positioned to determine whether access panel is in an opened or a closed position. A processor measures the amount of time that has passed since the access panel was last closed or opened and drives the illumination device at a reduced power level accordingly.

20 Claims, 8 Drawing Sheets

Related U.S. Application Data continuation of application No. 14/756,781, filed on Oct. 9, 2015, now Pat. No. 9,832,847.

(60) Provisional application No. 62/061,950, filed on Oct. 9, 2014.

(56) References Cited

U.S. PATENT DOCUMENTS

| | | | |
|---|---|---|---|
| 4,299,092 A | 11/1981 | Ibrahim | |
| 4,371,870 A | 2/1983 | Biferno | |
| 4,853,678 A | 8/1989 | Bishop, Jr. et al. | |
| 4,950,344 A | 8/1990 | Glover et al. | |
| 7,413,233 B1 | 8/2008 | Jung | |
| 7,513,637 B2 | 4/2009 | Kelly et al. | |
| 7,922,381 B2 | 4/2011 | Han et al. | |
| 8,254,121 B2 | 8/2012 | Lee et al. | |
| 8,417,376 B1 | 4/2013 | Smolen | |
| 8,578,081 B1 | 11/2013 | Fils | |
| 8,683,745 B2 | 4/2014 | Artwohl et al. | |
| 8,982,013 B2 | 3/2015 | Sako et al. | |
| 8,988,635 B2 | 3/2015 | Dunn et al. | |
| 9,052,536 B2 | 6/2015 | Artwohl et al. | |
| 9,155,405 B2 | 10/2015 | Artwohl et al. | |
| 9,500,801 B2 | 11/2016 | Dunn | |
| 9,500,896 B2 | 11/2016 | Dunn et al. | |
| 9,514,661 B2 | 12/2016 | Riegel | |
| 9,519,185 B2 | 12/2016 | Dunn et al. | |
| 9,526,352 B2 | 12/2016 | Dunn et al. | |
| 9,535,293 B2 | 1/2017 | Dunn | |
| 9,633,366 B2 | 4/2017 | Dunn | |
| 9,661,939 B2 | 5/2017 | Dunn et al. | |
| 9,684,124 B2 | 6/2017 | Dunn | |
| 9,733,420 B2 | 8/2017 | Dunn et al. | |
| 9,832,847 B2 | 11/2017 | Dunn et al. | |
| 9,881,528 B2 | 1/2018 | Dunn | |
| 9,983,427 B2 | 5/2018 | Dunn | |
| 2002/0064037 A1 | 5/2002 | Lee | |
| 2002/0075552 A1 | 6/2002 | Poll et al. | |
| 2002/0187575 A1 | 12/2002 | Maruyama et al. | |
| 2003/0062813 A1 | 4/2003 | Cording | |
| 2003/0117790 A1 | 6/2003 | Lee et al. | |
| 2004/0148055 A1 | 7/2004 | Shoenfeld | |
| 2004/0160388 A1 | 8/2004 | O'Keeffe | |
| 2005/0265019 A1 | 12/2005 | Sommers et al. | |
| 2006/0215958 A1 | 9/2006 | Yeo et al. | |
| 2006/0284788 A1 | 12/2006 | Robinson et al. | |
| 2007/0151274 A1 | 7/2007 | Roche et al. | |
| 2007/0171647 A1 | 7/2007 | Artwohl et al. | |
| 2007/0195535 A1 | 8/2007 | Artwohl et al. | |
| 2007/0214812 A1 | 9/2007 | Wagner et al. | |
| 2008/0024047 A1 | 1/2008 | Juo et al. | |
| 2008/0055534 A1 | 3/2008 | Kawano | |
| 2008/0094854 A1 | 4/2008 | Coleman et al. | |
| 2008/0284942 A1 | 11/2008 | Mahama et al. | |
| 2008/0295033 A1 | 11/2008 | Lee et al. | |
| 2009/0002990 A1 | 1/2009 | Becker et al. | |
| 2009/0015400 A1 | 1/2009 | Breed | |
| 2009/0097227 A1* | 4/2009 | Kim | F25D 27/005 362/92 |
| 2009/0121970 A1 | 5/2009 | Ozbek | |
| 2009/0178427 A1* | 7/2009 | Eichman | F25D 25/024 62/331 |
| 2009/0244884 A1* | 10/2009 | Trulaske, Sr. | A47F 3/001 362/94 |
| 2009/0278766 A1 | 11/2009 | Sako et al. | |
| 2009/0298547 A1 | 12/2009 | Kim et al. | |
| 2009/0300953 A1 | 12/2009 | Frisch et al. | |
| 2010/0026912 A1 | 2/2010 | Ho | |
| 2010/0118200 A1 | 5/2010 | Gelman et al. | |
| 2010/0162747 A1 | 7/2010 | Hamel et al. | |
| 2010/0189571 A1 | 7/2010 | Coonrod | |
| 2010/0238394 A1 | 9/2010 | Dunn | |
| 2010/0275477 A1 | 11/2010 | Kim | |
| 2010/0293827 A1 | 11/2010 | Suss et al. | |
| 2010/0309687 A1 | 12/2010 | Sampsell et al. | |
| 2011/0083460 A1 | 4/2011 | Thomas et al. | |
| 2011/0116000 A1 | 5/2011 | Dunn et al. | |
| 2011/0116231 A1 | 5/2011 | Dunn et al. | |
| 2011/0261282 A1 | 10/2011 | Jean et al. | |
| 2012/0020560 A1 | 1/2012 | Zarubinsky | |
| 2012/0105424 A1* | 5/2012 | Lee | G09F 9/35 345/212 |
| 2012/0105428 A1 | 5/2012 | Fleck et al. | |
| 2012/0206500 A1 | 8/2012 | Koprowski et al. | |
| 2012/0206941 A1 | 8/2012 | He | |
| 2012/0287368 A1 | 11/2012 | Que et al. | |
| 2012/0287379 A1 | 11/2012 | Koike | |
| 2013/0016296 A1 | 1/2013 | Fujita et al. | |
| 2013/0063326 A1 | 3/2013 | Riegel | |
| 2013/0063676 A1 | 3/2013 | Tsuchihashi et al. | |
| 2013/0120815 A1 | 5/2013 | Aspnes et al. | |
| 2013/0151006 A1 | 6/2013 | Garson et al. | |
| 2013/0158703 A1 | 6/2013 | Lin et al. | |
| 2013/0208447 A1 | 8/2013 | Maslen | |
| 2013/0211583 A1 | 8/2013 | Borra | |
| 2013/0265525 A1 | 10/2013 | Dunn et al. | |
| 2013/0271674 A1 | 10/2013 | Liu et al. | |
| 2013/0271696 A1 | 10/2013 | Dunn | |
| 2014/0062316 A1 | 3/2014 | Tischler et al. | |
| 2014/0078407 A1 | 3/2014 | Green et al. | |
| 2014/0085564 A1 | 3/2014 | Hendren et al. | |
| 2014/0104538 A1 | 4/2014 | Park et al. | |
| 2014/0137065 A1 | 5/2014 | Feng et al. | |
| 2014/0144083 A1 | 5/2014 | Artwohl et al. | |
| 2014/0204452 A1 | 7/2014 | Branson | |
| 2014/0285732 A1 | 9/2014 | Tanabe et al. | |
| 2014/0320950 A1 | 10/2014 | Saxe et al. | |
| 2014/0333541 A1 | 11/2014 | Lee et al. | |
| 2015/0035432 A1 | 2/2015 | Kendall et al. | |
| 2015/0172385 A1 | 6/2015 | Kuroyama et al. | |
| 2015/0177480 A1 | 6/2015 | Bullock et al. | |
| 2015/0250021 A1 | 9/2015 | Stice et al. | |
| 2015/0253612 A1 | 9/2015 | Hasegawa et al. | |
| 2015/0300628 A1 | 10/2015 | Dunn et al. | |
| 2015/0309263 A2 | 10/2015 | Abovitz et al. | |
| 2015/0338715 A1 | 11/2015 | Schaefer et al. | |
| 2015/0362667 A1 | 12/2015 | Dunn | |
| 2015/0362768 A1 | 12/2015 | Dunn | |
| 2015/0362792 A1 | 12/2015 | Dunn et al. | |
| 2015/0363819 A1 | 12/2015 | Dunn | |
| 2015/0366083 A1 | 12/2015 | Dunn et al. | |
| 2016/0037657 A1 | 2/2016 | Yoshizumi | |
| 2016/0061514 A1 | 3/2016 | Seo et al. | |
| 2016/0091755 A1 | 3/2016 | Dunn | |
| 2016/0095450 A1 | 4/2016 | Trulaske, Sr. | |
| 2016/0103275 A1 | 4/2016 | Diaz et al. | |
| 2016/0106231 A1 | 4/2016 | Dunn et al. | |
| 2016/0192451 A1 | 6/2016 | Dunn et al. | |
| 2017/0010771 A1* | 1/2017 | Bernstein | G06F 1/165 |
| 2017/0046991 A1 | 2/2017 | Riegel | |
| 2017/0068042 A1 | 3/2017 | Dunn et al. | |
| 2017/0068044 A1 | 3/2017 | Dunn | |
| 2017/0099960 A1 | 4/2017 | Dunn et al. | |
| 2017/0108735 A1 | 4/2017 | Dunn | |
| 2017/0228770 A1 | 8/2017 | Dunn | |
| 2017/0256115 A1 | 9/2017 | Diaz | |
| 2017/0329078 A1 | 11/2017 | Dunn et al. | |
| 2018/0012526 A1 | 1/2018 | Dunn et al. | |
| 2018/0020847 A1 | 1/2018 | Dunn et al. | |
| 2018/0035521 A1 | 2/2018 | Dunn et al. | |
| 2018/0151097 A1 | 5/2018 | Dunn | |

FOREIGN PATENT DOCUMENTS

| | | |
|---|---|---|
| CN | 101949526 A | 1/2011 |
| CN | 202815379 U | 3/2013 |
| EP | 3155607 A1 | 4/2017 |
| JP | 2008180502 A | 8/2008 |
| JP | 2010171010 A | 8/2010 |
| JP | 5173088 B1 | 3/2013 |
| JP | 2017531198 A | 10/2017 |
| KR | 20040045939 A * | 6/2004 |
| KR | 1020040045939 A | 6/2004 |

(56) References Cited

FOREIGN PATENT DOCUMENTS

| KR | 1020110119360 A | 11/2011 | | |
|----|----|----|----|----|
| KR | 20120044874 A | 5/2012 | | |
| WO | WO2006055873 A2 | 5/2006 | | |
| WO | WO2010116202 A1 | 10/2010 | | |
| WO | WO2013056109 A1 | 4/2013 | | |
| WO | WO2014006490 A1 | 1/2014 | | |
| WO | WO2015195681 A1 | 12/2015 | | |
| WO | WO-2016021751 A1 * | 2/2016 | ............. | F25D 11/00 |
| WO | WO2017151934 A1 | 9/2017 | | |
| WO | WO2018009399 A1 | 1/2018 | | |

OTHER PUBLICATIONS

Dave Roos, How Transmissive Film Works, 2008, 9 Pages.
Pilkington TEC Glass, For the Refrigeration Market, 2002, 2 Pages.

* cited by examiner

Flash Configuration https://123.456/ABC

- Display Config
- Controller Settings
- Network Settings
- Mezzanine Settings
- Auto Standby Settings
- Temp Control Settings
- Power Save Settings

Power Save Configuration:

| | |
|---|---|
| Power Save Mode | Enabled ▼ |
| Backlight Reduction Per Cent Level 1 | 34 |
| Backlight Reduction Per Cent Level 2 | 73 |
| Time Door Closed to Enable Level 1 (secs) | 300 |
| Time Door Closed to Enable Level 2 (secs) | 1800 |
| | Submit |

Production Test Home Page

Receiver Config

SYSTEM AND METHOD FOR DECREASING ENERGY USAGE OF A TRANSPARENT DISPLAY CASE

CROSS-REFERENCE TO RELATED APPLICATIONS

This application is a continuation of U.S. Non-Provisional patent application Ser. No. 15/782,373 filed Oct. 12, 2017, which is a continuation of U.S. Non-Provisional patent application Ser. No. 14/756,781 filed Oct. 9, 2015, which claims the priority of U.S. Provisional Application No. 62/061,950 filed Oct. 9, 2014, the disclosures of each of these applications are hereby incorporated by reference in their entireties.

TECHNICAL FIELD

Embodiments generally relate to systems for reducing the energy usage of transparent liquid crystal displays (LCD) within display cases.

BACKGROUND OF THE ART

Display cases are used in a number of different retail establishments for illustrating the products that are available for sale. In some instances these display cases may be coolers or freezers which are placed in grocery stores, convenience stores, gas stations, restaurants, or other retail establishments. In other instances these display cases may be non-refrigerated transparent containers used in a jewelry or watch store, bakery, deli, antique shop, sporting goods store, electronics store, or other retail establishments. While the design and appearance of the product itself does provide some point-of-sale (POS) advertising, it has been found that additional advertising at the POS can increase the awareness of a product and in turn create additional sales.

Most retail establishments already contain some POS advertising, and depending on the type of establishment the proprietor may want to limit the amount of 'clutter' in the retail area—resulting in a very limited space for additional POS advertising. It has now become desirable to utilize the transparent glass that is typically placed in display cases with additional POS advertising. Most notably, it has been considered that transparent LCDs may be positioned along with the transparent glass and could display additional advertising materials while still allowing a patron to view the products inside the display case.

SUMMARY OF THE EXEMPLARY EMBODIMENTS

An exemplary embodiment provides a system for reducing the energy usage of a transparent liquid crystal display by tracking the activity of the opening/closing of the door containing the transparent liquid crystal display.

The foregoing and other features and advantages of the present invention will be apparent from the following more detailed description of the particular embodiments, as illustrated in the accompanying drawings.

BRIEF DESCRIPTION OF THE DRAWINGS

A better understanding of an exemplary embodiment will be obtained from a reading of the following detailed description and the accompanying drawings wherein identical reference characters refer to identical parts and in which.

DETAILED DESCRIPTION

The invention is described more fully hereinafter with reference to the accompanying drawings, in which exemplary embodiments of the invention are shown. This invention may, however, be embodied in many different forms and should not be construed as limited to the exemplary embodiments set forth herein. Rather, these embodiments are provided so that this disclosure will be thorough and complete, and will fully convey the scope of the invention to those skilled in the art. In the drawings, the size and relative sizes of layers and regions may be exaggerated for clarity.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the invention are described herein with reference to illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figures 1, 2:
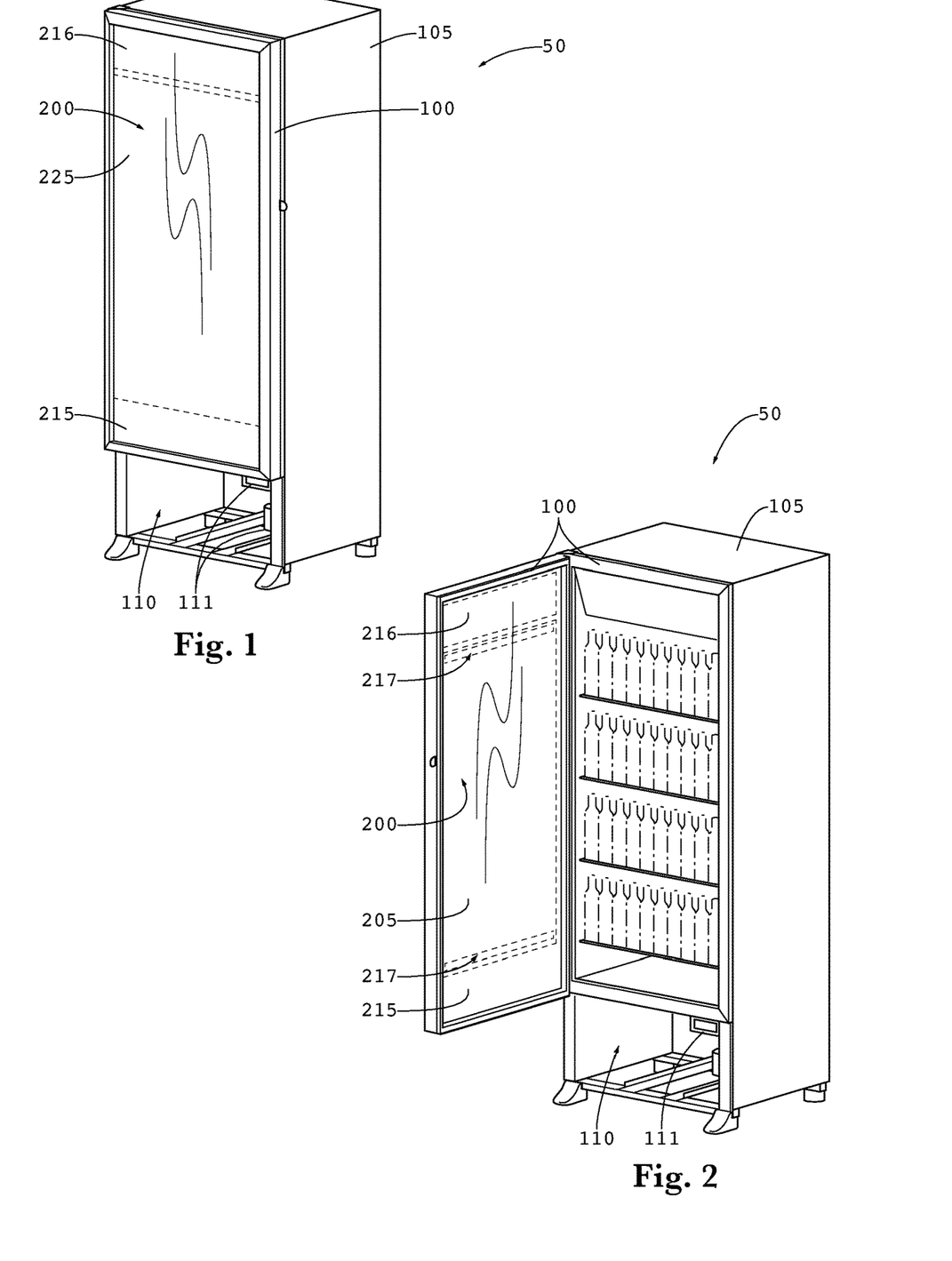
FIG. 1 is a perspective view of a refrigerated display case having a transparent LCD assembly.
FIG. 2 is a perspective view of the refrigerated display case of FIG. 1 where the door has been opened.

FIG. 1 is a perspective view of a refrigerated display case 50 having a transparent LCD 200. Generally, the display case includes a housing 105, to which a door frame assembly 100 is fastened. In this embodiment, a cavity 110 is provided below the door frame assembly 100 where various electronic devices 111 for operating the transparent LCD assembly 200 can be located.

FIG. 2 is a perspective view of the refrigerated display case of FIG. 1 where the door has been opened. The transparent LCD 200 is preferably sandwiched between a front glass 225 and rear glass 205. Also preferably sandwiched between the front and rear glass 225/205 is an upper plate 216 and a lower plate 215, each of which are preferably attached to the rear glass 225 such that heat from the plates can be conductively transferred to the rear glass 225 and removed by natural or forced convection.

In an exemplary embodiment, the upper and lower plates are preferably bonded to the rear glass 205 through adhesive transfer tape. An exemplary adhesive transfer tape for this purpose would be 468 MP, available commercially from 3M™ of St. Paul, Minn. www.3M.com/converter. In order to illuminate the transparent LCD 200, one or more printed circuit boards (PCBs) each containing a plurality of LEDs 217 is preferably in conductive thermal communication with either the upper, lower, or both plates. In this way, heat that is generated by the LEDs 217 can be transmitted to the PCB and eventually transferring to the rear glass 205 where the heat can dissipate through natural or forced convection.

The LEDs 217 may serve as a backlight for the transparent LCD 200 and may be arranged to direct light near or through the transparent LCD 200. A light guide may be used, but is not required. The light guide would preferably be placed between the transparent LCD 200 and the rear glass 205.

Figure 3:
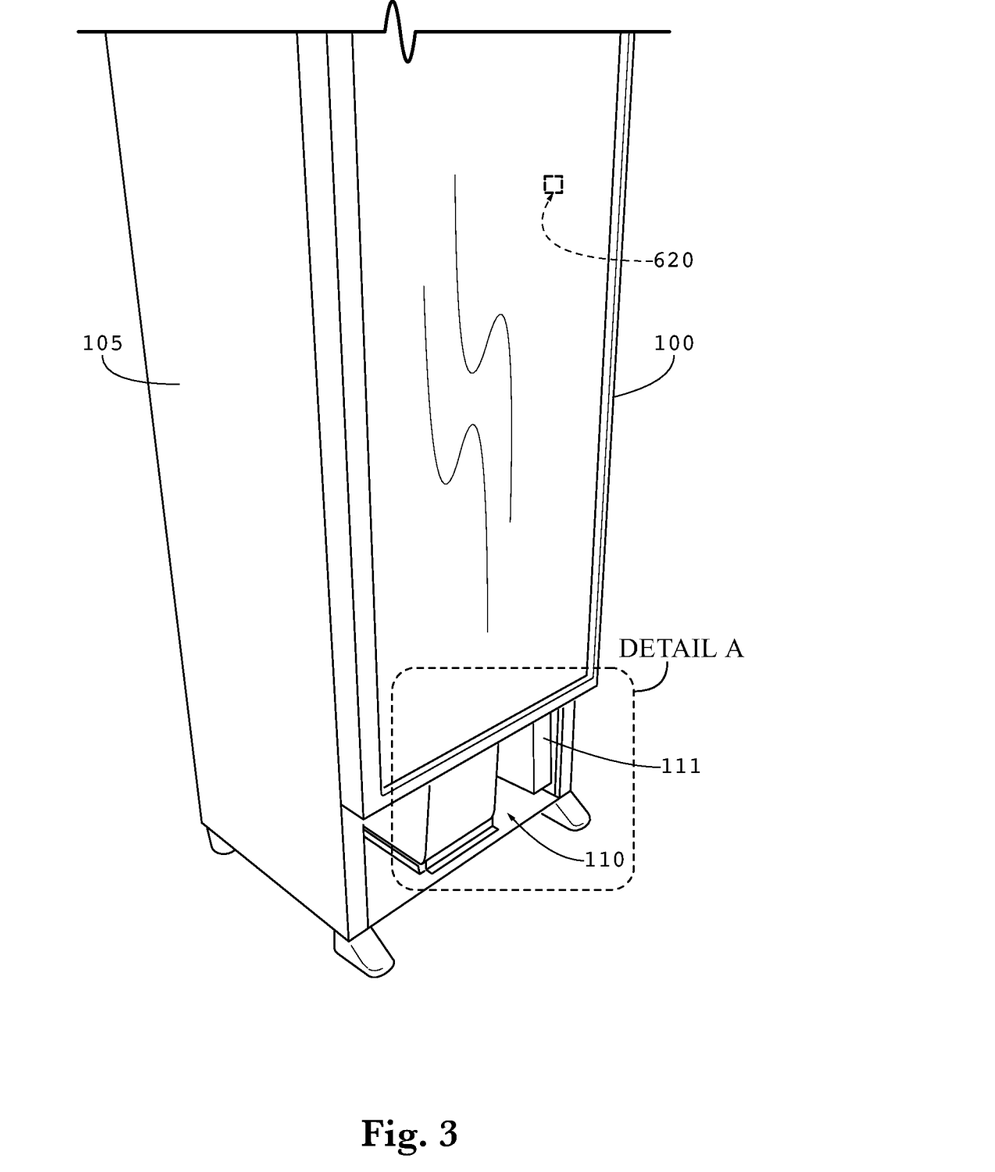
FIG. 3 is a perspective view of the refrigerated display case of FIG. 1 showing the cavity for electronic devices as well as the location of Detail A.

FIG. 3 is a perspective view of the refrigerated display case of FIG. 1 showing the cavity for electronic devices as well as the location of Detail A. Also shown in this figure is the temperature sensor 620 which is in electrical communication with the electronic devices 111.

Figure 4:
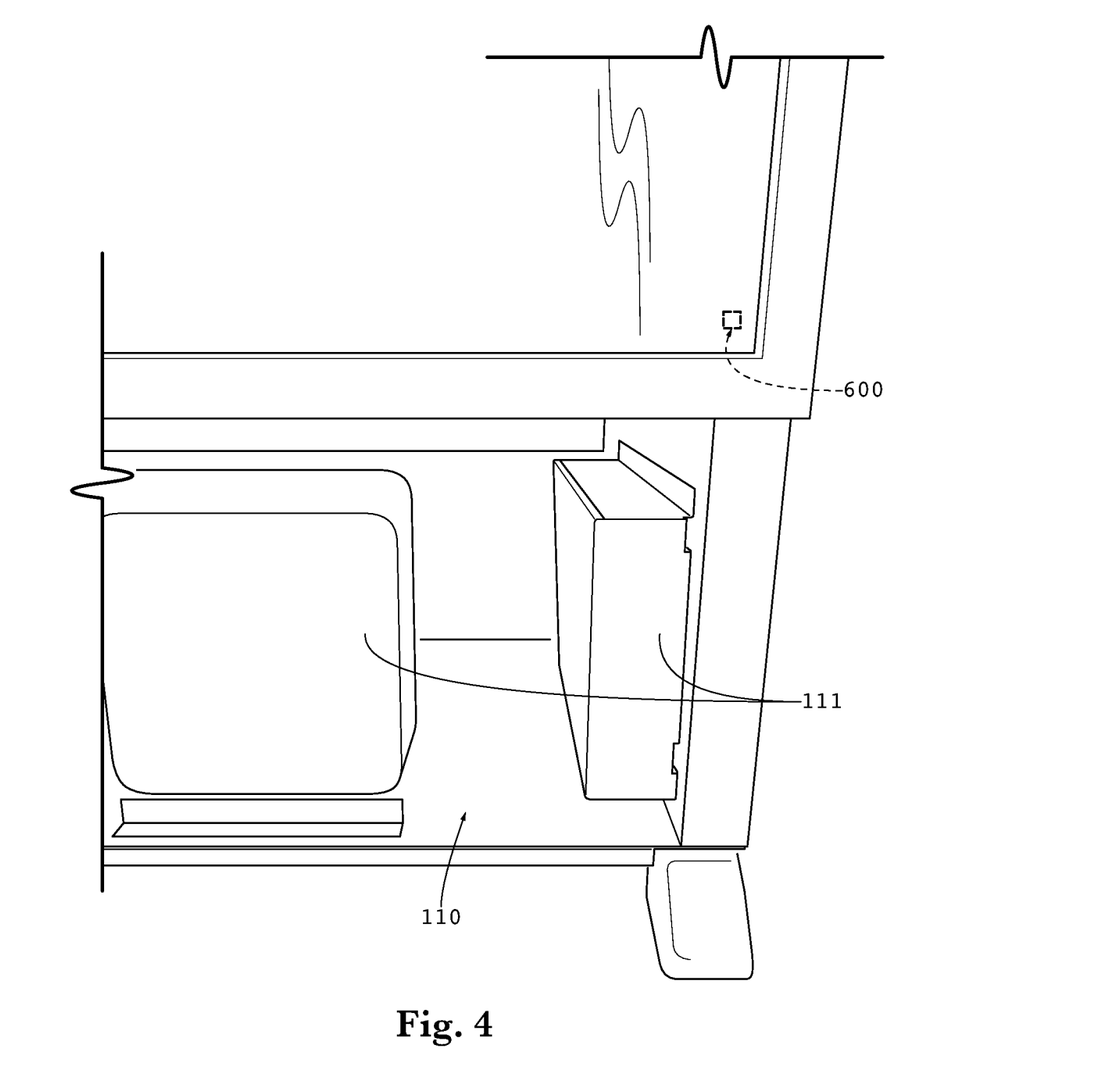
FIG. 4 is a front view of Detail A shown in FIG. 3.

FIG. 4 is a front view of Detail A shown in FIG. 3. Here, various electronic devices 111 are shown within the cavity 110, and would preferably include a CPU and a wireless transmitter/receiver. Also shown here is a door sensor 600 which is positioned to determine whether the door is currently open or not. The door sensor 600 is preferably in electrical communication with the CPU, which contains an electrical connection to either an internet or satellite network.

Figure 5:
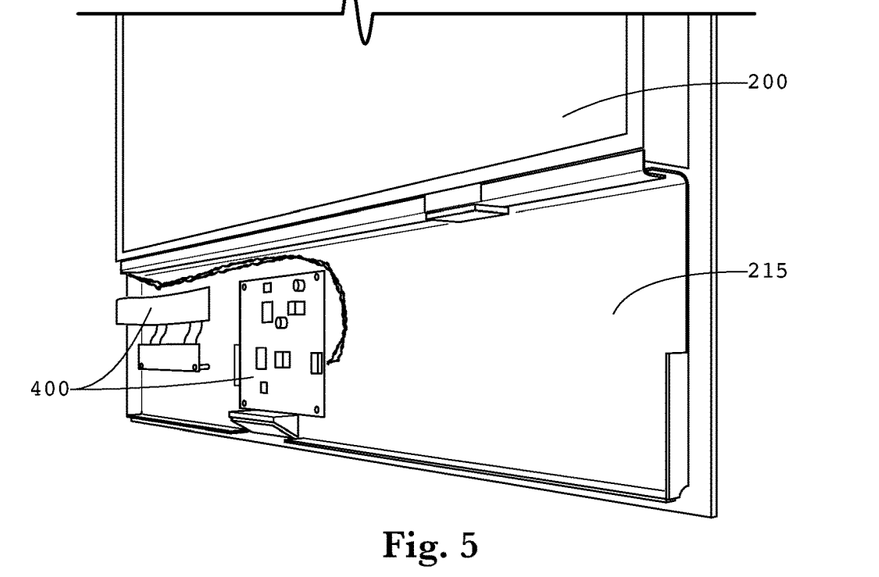
FIG. 5 is a perspective view showing a lower mounting plate and various electronic devices.

FIG. 5 is a perspective view showing a lower mounting plate 215 and various electronic devices 400 in electrical communication with the LCD 200 as well as the electronic devices 111.

Figure 6:
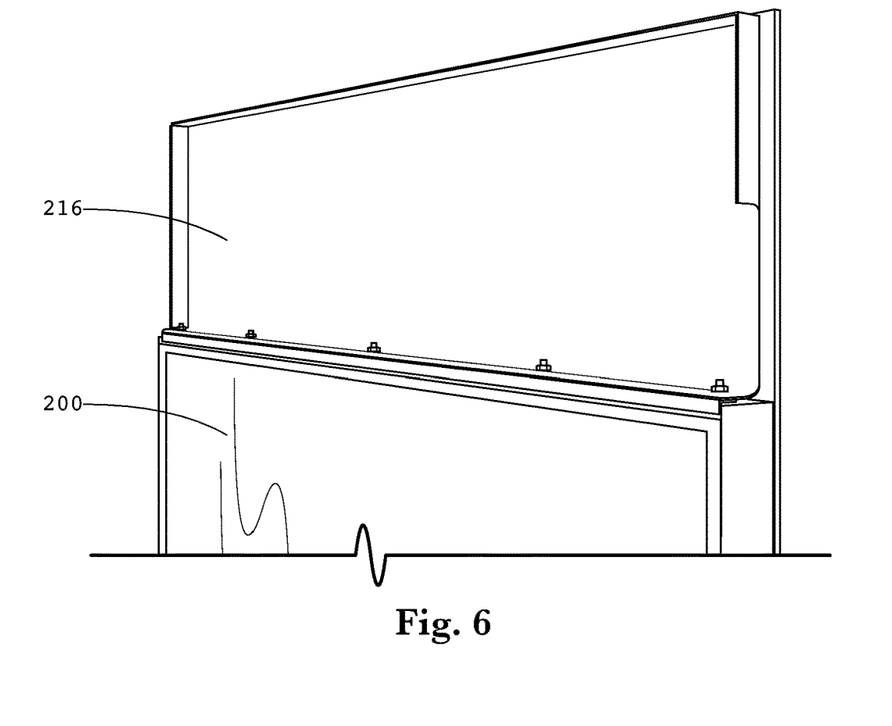
FIG. 6 is a perspective view showing an upper mounting plate.

As noted above, preferably the electronic devices 400 are in conductive thermal communication with the plate 215 which is preferably bonded to and in conductive thermal communication with the rear glass 205 so that heat generated by the electronic devices 400 can be removed. Similarly, FIG. 6 is a perspective view showing an upper mounting plate which can also be used to mount various electronic devices and is also preferably bonded to and in conductive thermal communication with the rear glass 205.

Figure 7:
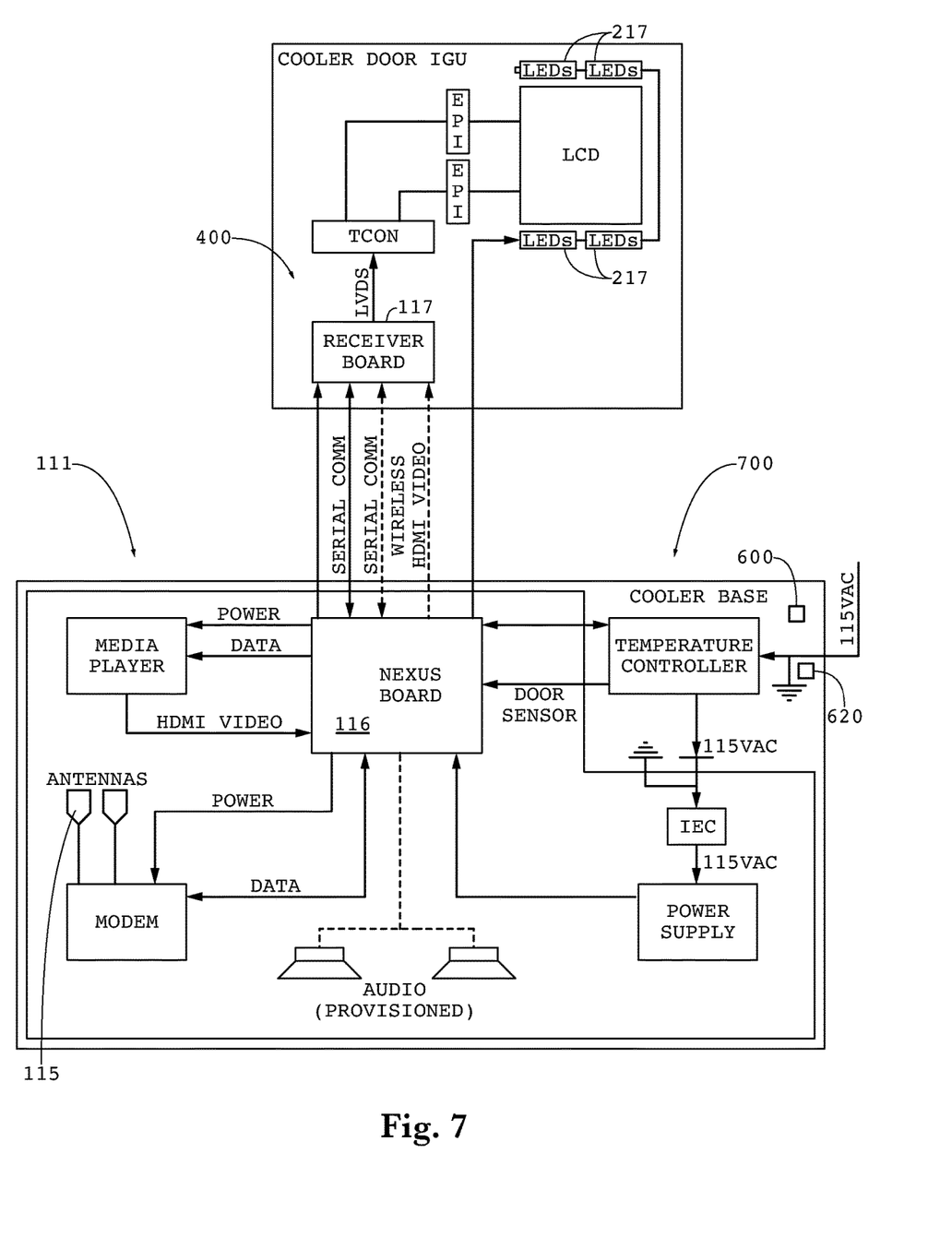
FIG. 7 is a block diagram for an exemplary embodiment of the electronic components within the door as well as the electronic components in the cavity below the door.

FIG. 7 is a block diagram for an exemplary embodiment of the electronic components 400 within the door as well as the electronic components 111 in the cavity 110 below the door. The antennas 115 can be cellular network antennas or can be Wi-Fi receiving devices. In some embodiments, the modem may be connected through a hard-wired internet connection rather than cellular or wireless. Preferably, the video signal from the media player is transmitted to the receiving board 117 through wireless communication, although this is not required. The modem may be configured to receive data and transmit said data to various components, such as the Nexus board 116. The data may include instructions for operation of the LEDs 217.

The Nexus board 116 and the Receiver board 117 each contain a wireless device for communicating back and forth between the two boards and can operate under any form of wireless networking technology, including but not limited to: WPAN, WLAN, a wireless mesh network, or GAN. Specifically regarding the architecture for a WLAN network, these could include but are not limited to stations, basic service set, extended service set, and a distribution system. Further regarding the types of wireless LANs, these could include but are not limited to peer-to-peer, bridge, and a wireless distribution system. Any form of general encryption method can be used with the exemplary embodiments herein.

The cooler base 700 preferably contains electrical circuitry to communicate various attributes of the cooler to the board 116. The cooler attributes that can be communicated include, but are not limited to: evaporator temperature, cooler temperature, door open/close status, energy saving mode status, compressor status, evaporator fan status, and defrost status. The board 116 can then transmit the cooler attributes to a remote user through the modem. The board 116 can also record and transmit various attributes of the board 116 as well as the media player. These attributes can include but are not limited to: video input status, video resolution, voltage/current, and board temperature.

The board 116 can also communicate several alarm conditions, including but not limited to: temperature sensor failures, receiver board 117 communication failures, invalid defrost temperature, defrost timeout, missed defrost cycle, high/low temp exceeded, invalid video input, and video input stalled.

The LEDs 217 may be arranged along the top and bottom edges of the transparent LCD 200. The LEDs may be electrically connected to the board 116.

Figure 8:
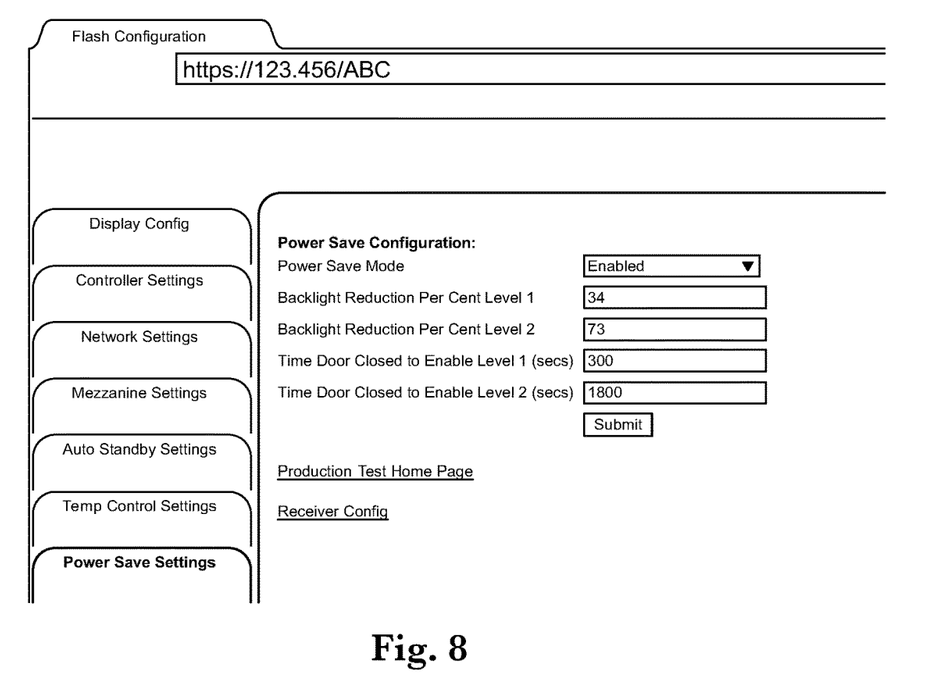
FIG. 8 is a screen shot of an exemplary user interface for operating a power saving mode.

FIG. 8 is a screen shot of an exemplary user interface for operating a power saving mode. The power saving mode can be 'enabled' or 'disabled.' The user can select a backlight reduction percent level 1, which provides the percentage of power reduction to the backlight when level 1 power saving is detected. In this example, the level 1 power reduction is 34% from the normal operation power level. The user can also select how long the door remains closed before initiating level 1 power saving. In this embodiment, level 1 power saving is initiated once the door has been closed for 300 seconds.

Additionally, the user can select a backlight reduction percent level 2, which provides the percentage of power reduction to the backlight when level 2 power saving is detected. In this example, the level 2 power reduction is 73% from the normal operation power level. The user can also select how long the door remains closed before initiating level 2 power saving. In this embodiment, level 2 power saving is initiated once the door has been closed for 1800 seconds.

Figure 9:
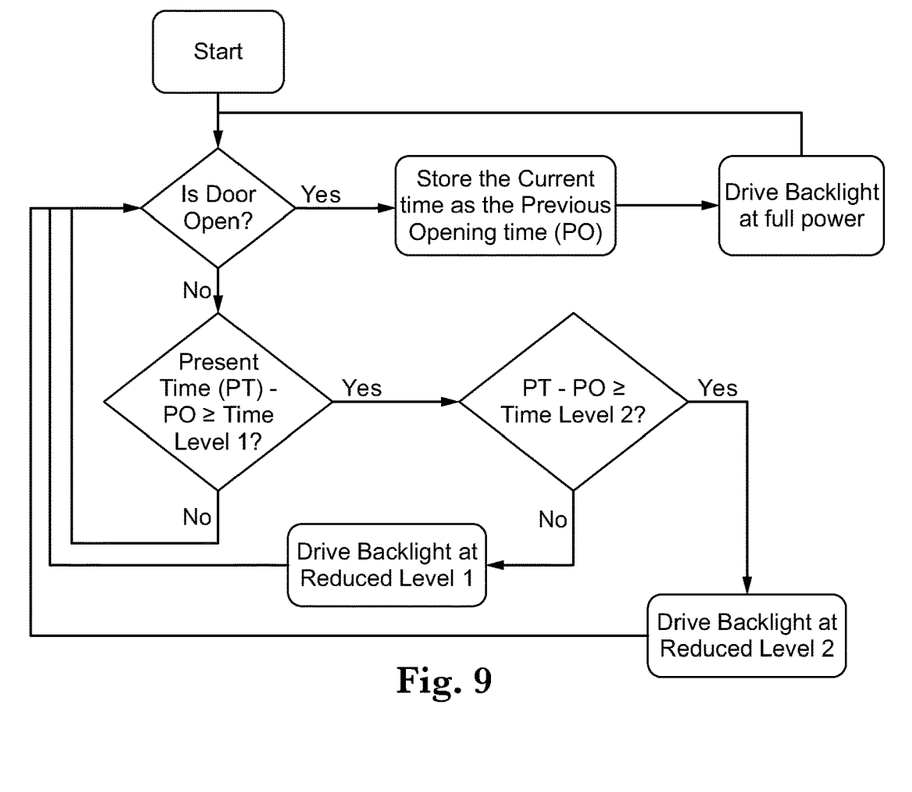
FIG. 9 is a flow chart for an exemplary logic structure for operating the optional power saving mode.

FIG. 9 is a flow chart for an exemplary logic structure for operating the optional power saving mode. The system first checks the sensor 600 to determine if the door is open. If yes, the current time is stored as the Previous Opening time (PO) and the backlight is driven at full power. If the door is closed, the present time is compared to the PO to determine how much time has elapsed since the previous door opening. The elapsed time may then be compared against predetermined time periods. If the time elapsed is not greater than Time Level 1 (ex. 300 seconds), the backlight continues to be driven at full power. If the time elapsed is greater than Time Level 1, the system moves on to compare the time elapsed with Time Level 2 (ex. 1800 seconds). If the time elapsed is less than Time Level 2, the backlight is driven at reduced level 1 (ex. 34% of full power). If the time elapsed is greater than Time Level 2, the backlight is driven at reduced level 2 (ex. 73% of full power).

Figure 10:
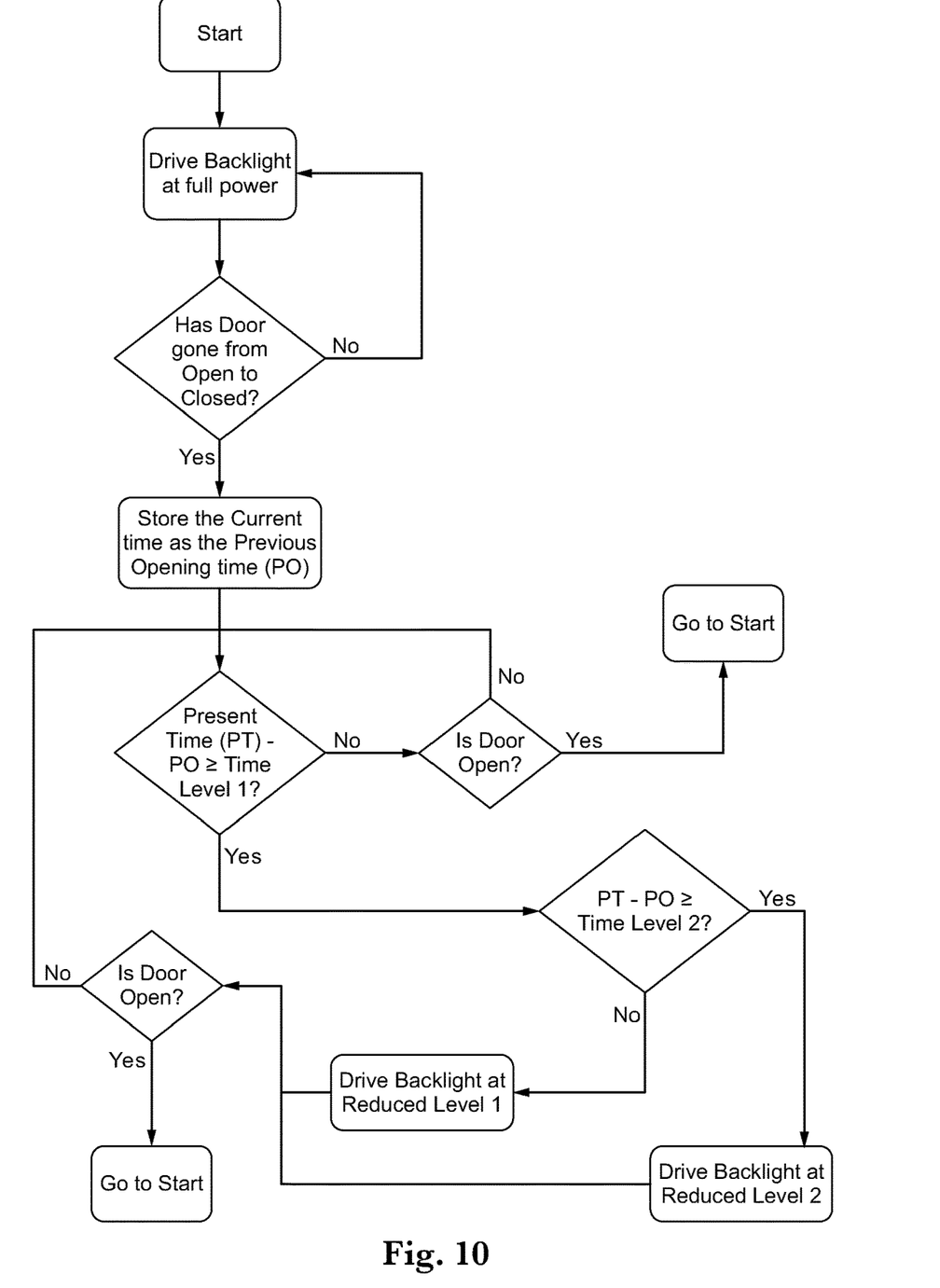
FIG. 10 is a flow chart for another exemplary logic structure for operating the optional power saving mode.

FIG. 10 is a flow chart for another exemplary logic structure for operating the optional power saving mode. The system preferably begins by driving the backlight at full power. Next, the sensor 600 is checked to determine if the door has gone from opened to closed. If not, the system continues to drive the backlight at full power and continues to monitor the sensor 600. If yes, the current time is stored as the Previous Opening time (PO) and the logic moves forward to determine how much time has elapsed since the PO. If the time elapsed is less than Time Level 1, the door sensor 600 is again checked and if the door is still closed the system will return to measure the elapsed time since the PO, if however the door has been opened the system will return to the start where the backlight is driven at full power.

If the time elapsed is greater than Time Level 1, the system then preferably compares the elapsed time since the PO and compares it to Time Level 2. If the elapsed time is less than Time Level 2, the backlight is preferably driven at Reduced Level 1. If the elapsed time is greater than Time Level 2, the backlight is preferably driven at Reduced Level 2. In either scenario the system will preferably again check the sensor 600 and if the door has been opened the system will return to the start where the backlight is driven at full power. If however the door remains closed, the system will preferably return to the logic step of comparing the elapsed time since the PO with Time Level 1.

Figure 11:
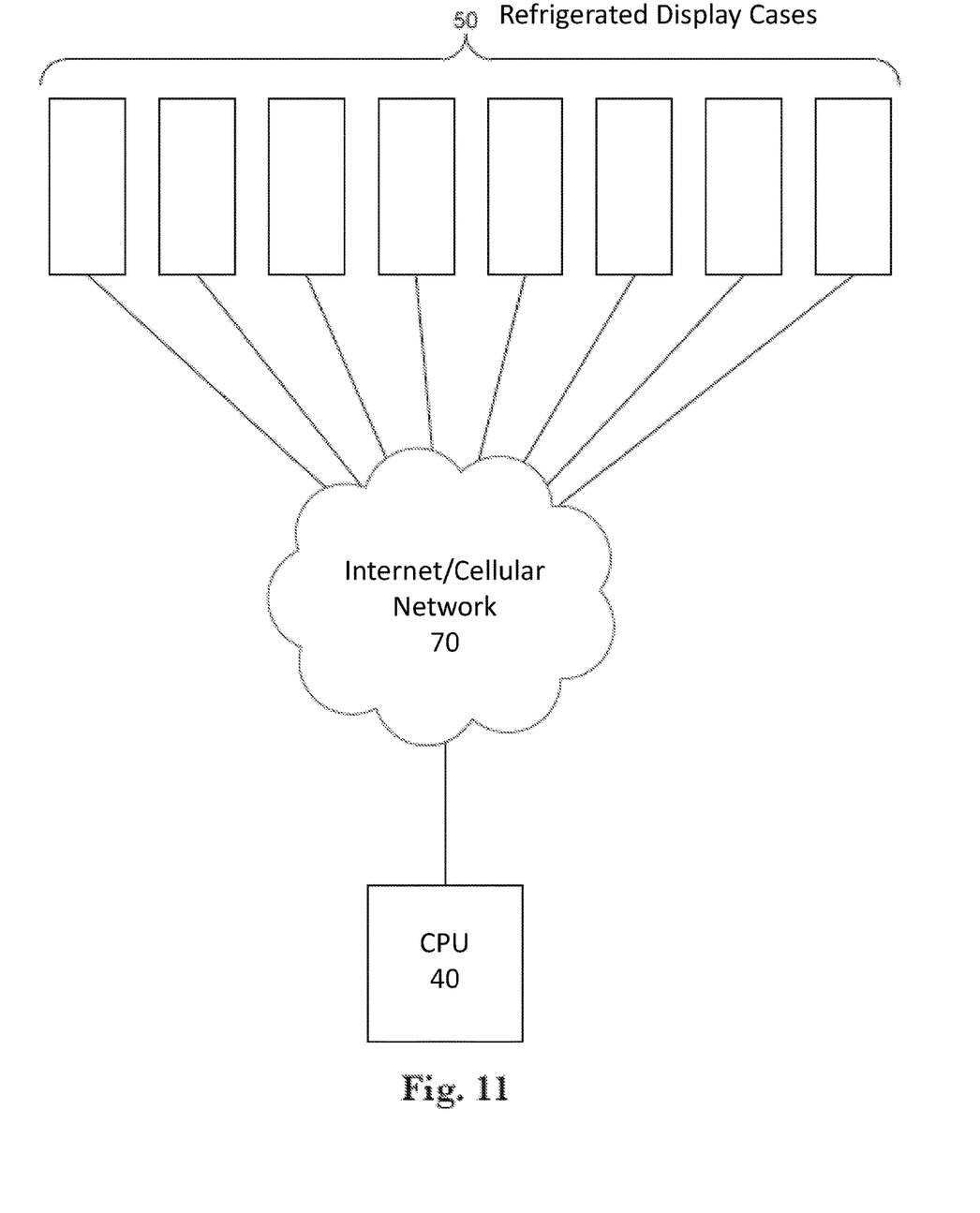
FIG. 11 is an electrical schematic representation of an exemplary embodiment of the system for tracking and analyzing display case usage.

FIG. 11 is an electrical schematic representation of an exemplary embodiment of the system for tracking and analyzing display case usage. Here, a plurality of display cases 50 are in communication with an internet/cellular network 70. Here, an operations center contains at least one CPU 40 which can communicate with the plurality of display cases 50 through the internet/cellular network 70.

The embodiments of the wireless communication and transparent LCD system described herein can be used with any number of display case designs, either temperature controlled or not, and with doors that open or glass that remains stationary. Although shown here with a transparent LCD, the wireless system could be used with a traditional backlit LCD as well.

Having shown and described a preferred embodiment of the invention, those skilled in the art will realize that many variations and modifications may be made to affect the described invention and still be within the scope of the claimed invention. Additionally, many of the elements indicated above may be altered or replaced by different elements which will provide the same result and fall within the spirit of the claimed invention. It is the intention, therefore, to limit the invention only as indicated by the scope of the claims.

We claim:

1. An apparatus for controlling the illumination of a display case comprising:
 a housing defining a compartment configured to hold a plurality of products;
 an access panel mounted to the housing, said access panel comprising a transparent display for displaying images, wherein the access panel is configured for movement between an opened position, whereby at least one of the plurality of products may be accessed, and a closed position;
 an illumination device for illuminating the transparent display;
 a sensor configured to determine if the access panel is in the opened position; and
 a processor electrically connected to the illumination device and the sensor, wherein said processor is configured to measure the time elapsed since the access panel was last moved out of the opened position and drive the illumination device at a reduced power level based upon the amount of time that has elapsed since the access panel was last moved out of the opened position.

2. The apparatus of claim 1 further comprising:
 a network communications device electrically connected to said processor and configured to receive power reduction data for the illumination device and transmit said power reduction data to the processor.

3. The apparatus of claim 2 wherein:
 the processor is configured to drive the illumination device at a normal power level unless and until the elapsed time reaches a predetermined threshold, then the processor is configured to drive the illumination device at the reduced power level according to the backlight power reduction data.

4. The apparatus of claim 3 wherein:
 the reduced power level is a non-zero power level.

5. The apparatus of claim 4 wherein:
 the processor is configured to drive the illumination device at a second reduced power level according to the power reduction data if the amount of time that has elapsed reaches a second predetermined threshold.

6. The apparatus of claim 1 wherein:
 the transparent display is an emissive display and the illumination device is integrated with the transparent display.

7. The apparatus of claim 1 wherein:
 the transparent display is a transmissive display and the illumination device comprises edge lighting.

8. An apparatus for controlling the illumination of a display case comprising:
 a housing defining a compartment configured to hold a plurality of products;
 an access panel mounted to the housing;
 a transparent display associated with said access panel and configured for display images, wherein the access panel is configured for movement between an opened position, whereby at least one of the plurality of products may be accessed, and a closed position whereby the access panel is located adjacent to the housing;
 an illumination device for illuminating the transparent display;
 a sensor configured to determine if the access panel is in the closed position; and
 a processor electrically connected to the illumination device and the sensor, wherein said processor is configured to measure the time elapsed since the access panel was last placed in the closed position and drive the illumination device at a reduced power level based upon the amount of time that has elapsed since the access panel was last placed in the closed position.

9. The apparatus of claim 8 further comprising:
a network communications device electrically connected to said processor and configured to receive power reduction data for the illumination device and transmit said power reduction data to the processor.

10. The apparatus of claim 9 wherein:
the processor is configured to drive the illumination device at a normal power level unless and until the elapsed time reaches a predetermined threshold, then the processor drives the illumination device at the reduced power level according to the backlight power reduction data.

11. The apparatus of claim 10 wherein:
the reduced power level is a non-zero power level.

12. The apparatus of claim 11 wherein:
the processor is configured to drive the illumination device at a second reduced power level according to the power reduction data if the amount of time that has elapsed reaches a second predetermined threshold.

13. The apparatus of claim 8 wherein:
the transparent display is an emissive display and the illumination device is integrated with the transparent display.

14. The apparatus of claim 8 wherein:
the transparent display is a transmissive display and the illumination device comprises edge lighting.

15. A method for controlling the illumination of a display case containing a plurality of products comprising the steps of:
displaying images on a transparent electronic display illuminated by way of one or more illumination devices and associated with an access panel such that the images and at least some of the plurality of products may be viewed at the same time, wherein the access panel is moveably mounted to a housing;
determining that the access panel has been moved from an opened position;
determining the time elapsed since the access panel was moved from the opened position; and
operating the one or more illumination devices at a reduced power level based upon the time elapsed since the access panel was last moved from the opened position.

16. The method of claim 15 wherein:
the reduced power level is a non-zero power level such that the images continue to be displayed on the transparent display.

17. The method of claim 15 further comprising the steps of:
accepting data at a processor by way of a network communications device for operation of the one or more illumination devices, wherein the data comprises a first percentage reduction level, a second percentage reduction level, a first period of elapsed time, and a second period of elapsed time.

18. The method of claim 17 further comprising the steps of:
driving the one or more illumination devices at a zero percent reduction in power when the access panel is opened;
reducing the power to the one or more illumination devices by the first percentage reduction level once the first period of elapsed time is reached; and
reducing the power to the one or more illumination devices by the second percentage reduction level once the second period of elapsed time is reached.

19. The method of claim 18 wherein:
the second percentage reduction level is greater than the first percentage reduction level; and
the second period of elapsed time is greater than the first period of elapsed time.

20. The method of claim 18 wherein:
the transparent display is a transmissive display; and
the one or more illumination devices are oriented along an edge of the transparent display.

* * * * *

UNITED STATES PATENT AND TRADEMARK OFFICE
CERTIFICATE OF CORRECTION

PATENT NO. : 10,555,406 B2
APPLICATION NO. : 16/113278
DATED : February 4, 2020
INVENTOR(S) : William Dunn et al.

Page 1 of 1

It is certified that error appears in the above-identified patent and that said Letters Patent is hereby corrected as shown below:

In the Claims

Column 6, Claim 8, Line 52, please delete "for" and insert -- to --.

Signed and Sealed this
Twenty-fourth Day of March, 2020

Andrei Iancu
*Director of the United States Patent and Trademark Office*